US008689009B2

(12) United States Patent
Bräutigam et al.

(10) Patent No.: US 8,689,009 B2
(45) Date of Patent: Apr. 1, 2014

(54) AUTHENTICATION-SECURED ACCESS TO A DATA CARRIER COMPRISING A MASS STORAGE DEVICE AND CHIP

(75) Inventors: Thomas Bräutigam, Riedering (DE); Andreas Johne, Gröbenzell (DE)

(73) Assignee: Giesecke & Devrient GmbH, Munich (DE)

( * ) Notice: Subject to any disclaimer, the term of this patent is extended or adjusted under 35 U.S.C. 154(b) by 1092 days.

(21) Appl. No.: 11/660,597

(22) PCT Filed: Aug. 19, 2005

(86) PCT No.: PCT/EP2005/008997
§ 371 (c)(1),
(2), (4) Date: Jul. 11, 2008

(87) PCT Pub. No.: WO2006/021383
PCT Pub. Date: Mar. 2, 2006

(65) Prior Publication Data
US 2009/0138726 A1    May 28, 2009

(30) Foreign Application Priority Data

Aug. 20, 2004    (DE) .......................... 10 2004 040 462

(51) Int. Cl.
*H04L 29/06* (2006.01)
(52) U.S. Cl.
USPC ............. 713/193; 713/189; 713/161; 726/26; 726/29
(58) Field of Classification Search
USPC ............................................ 380/22; 713/193
See application file for complete search history.

(56) References Cited

U.S. PATENT DOCUMENTS

| 5,390,251 | A | * | 2/1995 | Pastor et al. ................. 705/62 |
| 5,822,291 | A | * | 10/1998 | Brindze et al. ................ 369/94 |
| 5,905,798 | A | | 5/1999 | Nerlikar et al. |
| 5,991,399 | A | | 11/1999 | Graunke et al. |
| 6,044,046 | A | * | 3/2000 | Diezmann et al. ............. 369/14 |
| 6,047,242 | A | | 4/2000 | Benson |
| 6,104,813 | A | * | 8/2000 | McRae ........................ 380/201 |
| 6,357,005 | B1 | | 3/2002 | Devaux et al. |
| 6,575,372 | B1 | * | 6/2003 | Everett et al. ................. 235/492 |
| 6,751,598 | B1 | * | 6/2004 | Yagawa et al. ................ 705/51 |

(Continued)

FOREIGN PATENT DOCUMENTS

DE    196 16 819 A1    10/1997
DE    101 00 476 A1    9/2002

(Continued)

OTHER PUBLICATIONS

Search Report of German Patent office regarding German Patent Application No. 10 2004 040 462.3, Nov. 30, 2004.

(Continued)

*Primary Examiner* — Mohammad L Rahman
(74) *Attorney, Agent, or Firm* — Workman Nydegger

(57) ABSTRACT

The invention provides a method for accessing the mass memory of a data carrier with a mass memory and a chip. The data carrier has been or is personalized by an individual date of a use device which is or has already been stored in(to) the chip to a use device for accessing the data carrier, so that the data carrier can only be used with this use device.

20 Claims, 5 Drawing Sheets

(56) References Cited

U.S. PATENT DOCUMENTS

| | | | |
|---|---|---|---|
| 7,031,470 B1* | 4/2006 | Bar-On | 380/203 |
| 8,055,910 B2* | 11/2011 | Kocher et al. | 713/193 |
| 2003/0079133 A1 | 4/2003 | Breiter et al. | |
| 2004/0042363 A1 | 3/2004 | Kobayashi et al. | |
| 2004/0049464 A1* | 3/2004 | Ohmori et al. | 705/51 |
| 2004/0078720 A1* | 4/2004 | Ito et al. | 714/45 |
| 2005/0071272 A1* | 3/2005 | Yoshioka et al. | 705/51 |

FOREIGN PATENT DOCUMENTS

| | | |
|---|---|---|
| DE | 103 01 927 A1 | 8/2004 |
| EP | 1069564 | 1/2001 |
| EP | 0 881 559 B1 | 8/2003 |
| EP | 1 349 058 A1 | 10/2003 |
| FR | 2 790 346 | 9/2000 |
| JP | 2000285592 | 10/2000 |
| JP | 2002015512 | 1/2002 |
| JP | 2003132623 | 5/2003 |
| WO | WO 94/06071 | 3/1994 |
| WO | WO 00/51119 | 8/2000 |
| WO | WO 02/11081 A1 | 2/2002 |
| WO | WO 2004006248 A1 * | 1/2004 |
| WO | WO 2004100002 A2 * | 11/2004 |

OTHER PUBLICATIONS

Japanese Office communication for Japanese Application No. 2007-526397 dated Sep. 28, 2010.

* cited by examiner

AUTHENTICATION-SECURED ACCESS TO A DATA CARRIER COMPRISING A MASS STORAGE DEVICE AND CHIP

FIELD OF THE INVENTION

The invention relates to a method for accessing the mass memory of a data carrier with a mass memory and a chip, wherein for the use of the data an authentication is mandatory. The invention furthermore relates to a corresponding data carrier secured by an obligation of authentication and a method for loading data into such a data carrier.

BACKGROUND

The data carrier in the sense of the invention with a mass memory is e.g. a data carrier with an optical (mass) memory like e.g. a compact disk (CD), rewritable CD (CD-RW), digital versatile disk (DVD) or DVD-RW. Alternatively, as data carrier a data carrier with an electronic mass memory such as e.g. a flash memory, ROM or EEPROM memory may be present, e.g. a compact flash (CF) memory card, a secure disk (SD) memory card, a multimedia disk (MMD) or a memory card similar thereto, such as those used e.g. in digital multimedia devices, such as e.g. digital cameras, camcorders, MP3 players and the like. A data carrier with an optical mass memory selectively has a round shape, corresponding to a conventional CD or DVD. Alternatively the data carrier with an optical mass memory has a rectangular shape, corresponding to a chip card, which has e.g. the outer dimensions of a chip card according to ISO/IEC 7816, but which has in addition a center hole and a ring-shaped mass memory, wherein the outer dimensions of the data carrier in relation to the center hole do not exceed the dimensions of a conventional CD or DVD, so that the optical mass memory of the data carrier can be read out in a commercial CD or DVD drive.

The chip in the invention is preferably integrated in a chip module and contacted such that it is contactable with a writing and/or reading device in a contactless or contact manner. Selectively the chip is contacted according to ISO/IEC 7816 (contact) or ISO/IEC 10 536 (contactless) or ISO/IEC 14 443 (contactless). Alternatively the chip is contactable pursuant to any desired other protocol, e.g. USB, RS232/V.24.

Program software for installation in computers of all kinds such as e.g. personal computers or microcomputers (personal digital assistant, mobile phone) is widely distributed on data carriers with optical mass memories such as e.g. CDs or DVDs. Audio data and video data are also widely stored in CDs and DVDs. Multimedia data for digital multimedia devices such as digital cameras, digital camcorders, audio/video players such as MP3 players and the like are often stored in data carriers with electronic mass memories such as compact flash (CF) memory cards, secure disk (SD) memory cards, etc.

For protection against piracy the data in the mass memory are often completely or partly encrypted. This renders the data for example unreadable. Multimedia data like audio data or video data can be rendered distorted or noisy through the encryption. In demonstration versions it can be provided that the data are encrypted by exception of a part of the data released for demonstration purposes.

From DE 196 16 819 A1 a CD with a chip as access protection for the information on the CD is known. The CD has a circular CD body with an information carrying layer. In addition in the CD a chip and a coil for the contactless transmission of data between the chip and a data processing device are integrated. In the chip data are stored and data can be processed without which no or no correct processing of the information stored in the CD is possible. The stored data in the chip are e.g. keys or algorithms for decrypting the information stored in the CD.

From WO 00/51119 a CD-ROM or similar optical disk with a chip as access protection for the data on the CD-ROM is known. In the CD-ROM data are stored which are completely or partly encrypted. The chip contains a secret key with which the encrypted data on the CD-ROM can be decrypted without the key leaving the chip, and a data exchange means. Preferably the chip contains the crypto processor necessary for decryption. The key can be individual for each CD-ROM. When the CD-ROM is produced data are encrypted with the key and stored into the CD-ROM. The used key is stored into the chip for the purpose of decrypting the encrypted data again. When the CD-ROM is used data are read out from the CD-ROM into a computer and sent from the computer to the chip. In the chip the data are decrypted with the key and finally output via the data exchange means of the chip, e.g. to the computer. For each use of the CD-ROM therefore access to the chip is necessary. Hence a copy of the CD-ROM in which only the optical memory is copied is inoperable. Since the data are encrypted inside the chip and the key never leaves the chip the key cannot be copied. Accordingly, no functional copy of the CD-ROM can be made.

The CD-ROM with the chip known from WO 00/51119 thus cannot be copied. However, the original of the CD-ROM can be used as desired, for example on different computers or players, and can be lent to other users as desired.

It is frequently desirable that only the authorized first user, e.g. the paying purchaser or an ulterior authorized person, can use the CD-ROM. This problem is not solved in the CD-ROM of WO 00/51119.

From WO 02/11081 a further data carrier (e.g. CD or DVD) is known with an optical memory in which data are stored at least partly in an encrypted state, and with a chip in which a key for decrypting the encrypted data is stored. According to WO 02/11081 in a method for reading out the data carrier the data are read out from the optical memory with a writing/reading device, delivered to the chip, decrypted inside the chip with the key and subsequently output to the writing/reading device. The chip carries out an authentication verification of the reading/writing device. Only after a successful authentication verification of the writing/reading device the chip enables a reading out of the encrypted data contained in the optical memory by the writing/reading device. WO 02/11081 does not specify how the enforcement of the authentication can be achieved. A data carrier which enforces such an authentication and thus protects the data in the optical memory against unauthorized use is not specified in WO 02/11081 either.

Proceeding from the method known from WO 02/11081 for reading out data from the data carrier it is the object of the invention to provide a secure method for accessing the mass memory of a data carrier of the above-mentioned type in which for the use of the data an authentication is mandatory, and a corresponding data carrier and a method for loading of data into such a data carrier.

SUMMARY

The problem is solved by a method according to one of the independent method claims and by a data carrier according to the independent apparatus claim. Advantageous embodiments of the invention are specified in the dependent claims.

The inventive method for accessing the mass memory of a data carrier is based on a data carrier with a mass memory and a chip. For accessing the mass memory by means of a use device an authentication of the use device vis-à-vis the chip is mandatory. According to the invention the obligation of the authentication is achieved in such a way that when a use device accesses the data carrier in order to access the mass memory the chip is verified with a view to whether in the chip a date which is individual for the use device is stored, by means of which the data carrier is personalized to the use device. The access to the mass memory of the data carrier in which the desired data (use data) are stored is only enabled if in the chip at least one predetermined individual date of the use device is stored.

In the case that in the chip no individual date is stored, the access to the mass memory of the data carrier is not granted at least for the time being. In the case that in the chip an individual date is stored, such date has to represent an individual date of exactly the accessing use device. In other words the data carrier has to be personalized to a special use device. The data (use data) stored in its mass memory can only be used by means of the use device to which the data carrier is personalized. In this way it can for example be provided that only a predetermined computer or a predetermined CD player or DVD player or memory card reader can use the data carrier.

Therefore, a particularly secure method for accessing the mass memory of a data carrier with a mass memory and a chip is provided, in which for accessing the mass memory by means of a use device an authentication of the use device vis-à-vis the chip is mandatory Selectively the chip is personalized with several different individual data of one single use device.

Preferably, in the case that according to the verification no individual date is stored in the chip, at least one predetermined individual date of the use device is stored into the chip. In other words the data carrier is personalized to the use device if it has not yet been personalized to a specific use device, for example since the data carrier is put in operation for the first time.

Furthermore preferably, before the predetermined individual date of the use device is stored into the chip, an encryption key stored in the chip is sent to the use device by the chip. The use device encrypts the predetermined individual date with the encryption key and sends the encrypted individual date to the chip.

Preferably, in the case that according to the verification already at least one predetermined individual date is stored in the chip, the individual date stored in the chip and a corresponding date supplied by the accessing use device are compared with each other. Only in the case of a successful comparison the access by the use device to the mass memory of the data carrier is enabled.

Preferably the data in the mass memory are at least stored partly in an encrypted state, wherein in the chip further a key for decrypting the encrypted data is stored. The encryption of the data offers additional protection and prevents that the mass memory of the data carrier is used possibly bypassing the chip.

Further preferably, after the access to the mass memory has been granted since the data carrier is personalized to the accessing use device (i.e. after the use device has authenticated itself vis-à-vis the chip, or after the chip has been personalized), the data from the mass memory are decrypted with the key from the chip.

According to a preferred embodiment the data are decrypted within the chip. This has the advantage that the key does not need to leave the chip. Alternatively, and in the case that the use device (computer, CD player, DVD player) has a security module such as e.g. a TPM (trusted platform module), the data are selectively decrypted in the security module (e.g. TPM).

The individual date is preferably kept secret. In this way it can be ensured that the individual date cannot be tapped and copied. For example the individual date is kept secret in that it has been or is stored in an encrypted state in(to) the chip and is never made available in an unencrypted state outside the chip, for example never leaves the chip in an unencrypted state. Alternatively it can be provided that the individual date does not leave the chip at all.

The use device preferably has a microprocessor wherein as individual date an individual parameter of the microprocessor is used, in particular the microprocessor serial number. The microprocessor can, depending on the type of use device, be the microprocessor of a computer or a microprocessor of a CD/DVD drive of a computer or a microprocessor of a CD/DVD player or CD/DVD recorder-player with a microprocessor.

According to a preferred embodiment the at least one individual date is stored in the use device in a security module such as e.g. a trusted platform module (TPM). The security module (e.g. trusted platform module (TPM)) has a microprocessor chip in which the data are installed in an encrypted state. For a computer for example preferably the serial number or a different individual parameter of the computer microprocessor is installed in an encrypted state in a security module (e.g. TPM). Further, a computer or other use device can have further electronic components, such as e.g. a microprocessor and/or a CPU and/or a network interface card and/or a mass memory and/or a security module. In this case an individual parameter (e.g. serial number) of one or several of the above-mentioned or further electronic components is selectively installed in the security module—as an alternative or in addition to the serial number (or the other individual parameter) of the microprocessor. The security module (e.g. TPM) enables a user to read out the data installed in an encrypted state in the security module (e.g. TPM) and to make them available for processing purposes, for example to carry out a comparison with other data, without making the data available to the user in an unencrypted state, i.e. wherein the read-out data are kept secret from the user.

The data in the mass memory can be encrypted using a symmetrical or an asymmetrical encryption method.

Preferably the key stored in the chip is individual for each data carrier. For encrypting the data before storing them into the mass memory preferably a universal key is used which is identical for a plurality of data carriers.

Selectively the chip is adapted such that the individual data of several use devices can be stored in the chip. In this case the data carrier is personalized to several use devices, each of which is authorized to use the data in the mass memory of the data carrier.

The data carrier according to the invention has at least one mass memory and one chip. Further the data carrier preferably has a contact means for contacting the chip, selectively a contact means for contact contacting and/or a contact means for contactless contacting. In order to compensate for an undesirable distribution of weight possibly brought about by the chip the data carrier can have one or several balancing weights.

In a method for loading data from a data source into the mass memory of a data carrier with a mass memory and a chip when the data carrier is accessed in order to load data into the mass memory, the chip is verified with a view to whether in the chip at least one individual date for a use device is stored, through which the data carrier is personified to the at least one predetermined use device. The loading of data into the mass memory is only enabled if at least one predetermined individual date of a use device is stored in the chip. Subsequently access to the data in the mass memory is only possible with the at least one use device to which the data carrier is personified.

The data are selectively transmitted with the interposition of a contact computer network from the data source to the data carrier in order to be loaded into the mass memory of the data carrier. The computer network can for example be an internet network, an intranet network or the like. Selectively the data are transmitted to the data carrier via email.

Selectively the data are transmitted with the interposition of a contactless network from the data source to the data carrier, in order to be loaded into the mass memory of the data carrier. The contactless network can for example be a mobile communications network, such as e.g. a GSM or UMTS network, or a WLAN network (WLAN=wireless local area network). In a mobile communications network the data are selectively transmitted via SMS or via a service for direct data transmission.

The data can selectively be transmitted from the data source directly to the data carrier. Alternatively the data are first transmitted from the data source to a terminal such as e.g. a computer, notebook, mobile phone, PDA (personal digital assistant) or the like and are loaded from the terminal into the mass memory of the data carrier.

For example the data carrier is a CD or DVD with chip. In the chip a serial number or the like is stored. The data are first loaded from the data source onto a computer etc. and are subsequently written on a CD or DVD.

The loading of the data is preferably carried out as follows:
the individual date stored in the chip is transmitted from the chip to the access range of the data source,
in the access range of the data source the transmitted individual date is evaluated and
the data are transmitted to the data carrier to load them into the mass memory.

Therein the data can of course again be transmitted with the interposition of a terminal to the data carrier.

Preferably the data are loaded into the mass memory in an encrypted state. According to a preferred embodiment the data are encrypted with a key which is generated from the individual date in the chip of the data carrier.

BRIEF DESCRIPTION OF THE DRAWINGS

The invention will hereinafter be explained in greater detail on the basis of embodiments and with reference to the drawing, in which is shown.

DETAILED DESCRIPTION OF VARIOUS EMBODIMENTS

Figure 1:
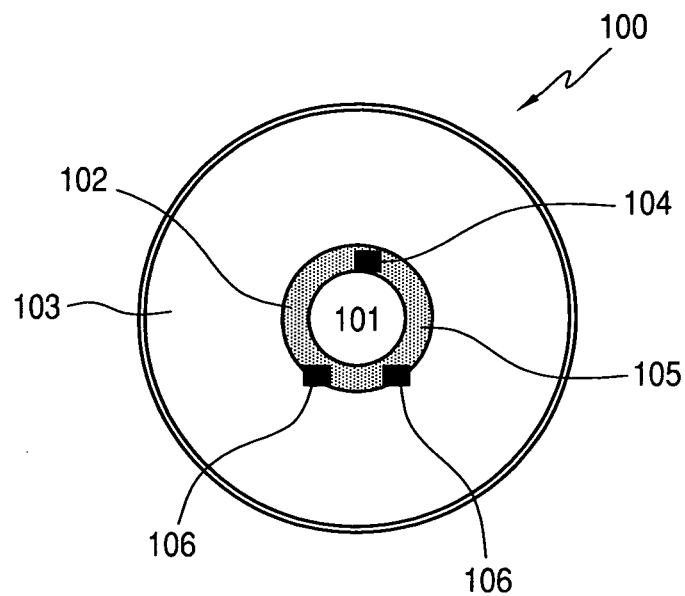
FIG. 1 an exemplary inventive CD/DVD having an optical memory, a chip, a contact field for contacting the chip and two balancing weights.

FIG. 1 shows an exemplary inventive CD/DVD 100. The CD/DVD 100 has, like a conventional CD/DVD, a center hole 101, around which a ring-shaped section 102 free of optical memory is disposed, around which a further ring-shaped data section 103 is disposed. In the data section 103 an optical memory (mass memory) is provided. In contrast to a conventional CD/DVD 100 in the inventive CD/DVD 100 of FIG. 1 in the free section 102 between the optical memory 103 and the center hole 101 a chip 104, a contact field 105 for contacting the chip and two balancing weights 106 are disposed. The chip 103 and the balancing weights 106 are arranged in such a way that the CD/DVD 100 preferably has no unbalance and that the center of gravity preferably lies in the center of the circular CD/DVD 100. Selectively no or a different suitable number and type of arrangement of balancing weights are provided.

Figure 2:
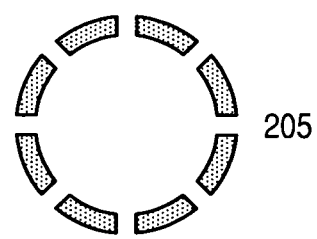
FIG. 2 an example for a contact field intended for attachment to a CD/DVD for contact contacting a chip disposed on the CD/DVD.

FIG. 2 shows an example of a contact field 205 intended for attachment to a CD/DVD such as the one shown in FIG. 1 for contact contacting of a chip also disposed on the CD/DVD. The contact field is designed in a ring shape so that it can be disposed on a CD/DVD 100 such as the one shown in FIG. 1 in the free section 102 between the center hole 101 and the data section 103. The contact field 205 has eight (generally typically two to ten) individual contact surfaces in the shape of ring segments which are arranged along a circular path.

Figure 3:
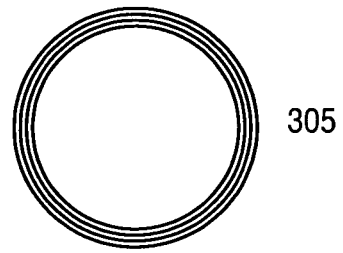
FIG. 3 a further example for a contact field intended for attachment to a CD/DVD for contact contacting of a chip disposed on the CD/DVD.

FIG. 3 shows a further example for a contact field 305 intended for attachment on a CD/DVD. The contact field 305 is, similar to the contact field 205 from FIG. 2, designed in a ring shape, but has six ring-shaped contact surfaces which are arranged concentrically to each other.

In an inventive CD/DVD for example in the free section 102 between the center hole 101 and the data section 103 a contact field 205, 305 according to FIG. 2 or FIG. 3 is present, so that a chip 104 disposed on the CD/DVD 100 can be contacted. The individual contact surfaces (e.g. six to eight pieces) can be controllable e.g. in accordance with ISO/IEC 7816 or a different protocol (USB, RS232/V.24, etc.). The contact field according to FIG. 3 with the ring-shaped contact surfaces has the advantage that it can also be contacted when the CD/DVD is in rotary motion, e.g. since the ring-shaped optical memory is being accessed or access thereto is intended.

Figure 4:
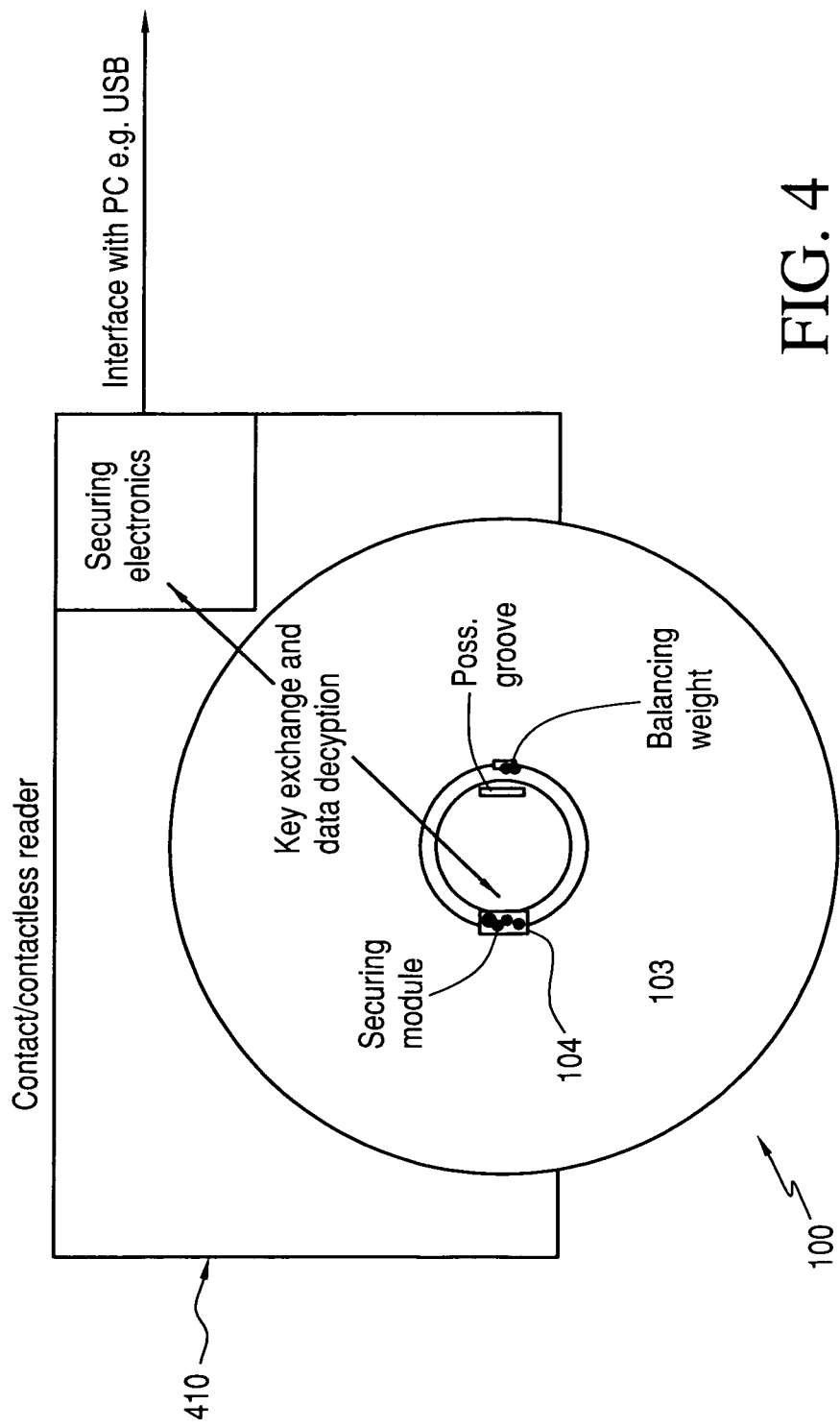
FIG. 4 an inventive CD/DVD with an optical memory, a chip and a balancing weight, as well as a reading device designed for the inventive CD/DVD with a means for accessing the chip.

FIG. 4 shows an inventive CD/DVD 100 with an optical memory 103, a chip 104 and a balancing weight, and a reading device 410 designed for the inventive CD/DVD 100 with a means for accessing the chip.

Figure 5:
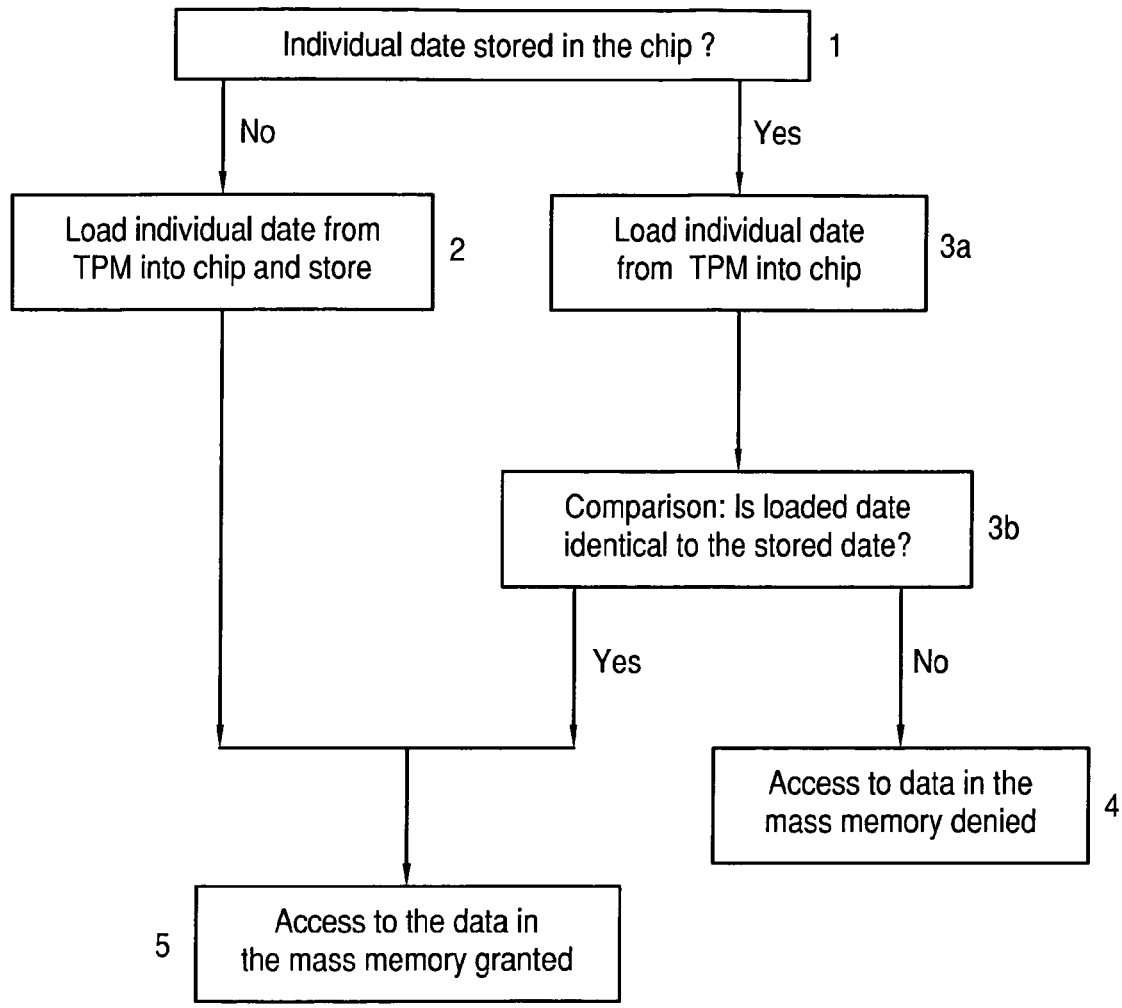
FIG. 5 a flowchart to illustrate a method for accessing the mass memory of a data carrier, in accordance with a preferred embodiment of the invention.

FIG. 5 shows a flowchart to illustrate the main features of a method for accessing the mass memory of a data carrier according to a preferred embodiment of the invention. The data carrier has a mass memory with data and a chip. With a use device it is attempted to access the data in the mass memory.

In step 1 it is verified whether the chip of the data carrier contains a predetermined individual date. In the case that the chip does not contain the predetermined individual date or does not contain any individual date at all, in step 2 the individual date from a security module of the use device, which is implemented as a trusted platform module TPM here, is loaded into the chip and stored into the chip, whereby the data carrier is personalized to the use device. Subsequently access to the data in the mass memory is granted. In contrast, in the case that in the chip a predetermined individual date is already stored, in step 3a the individual date is loaded into the chip and in step 3b the loaded individual date is compared with the already stored individual date. If the loaded individual date and the already stored individual date differ from each other, access to the data in the mass memory is denied. In contrast, if the loaded individual date and the already stored individual date are identical, access to the data in the mass memory is granted. In the case that in the chip individual data of several use devices are stored and the data carrier is thus personalized to several use devices, it is verified whether there is among the individual data an individual date of the currently accessing use device and otherwise proceeded analogously to a data carrier which is personalized to one single use device only.

Figure 6:
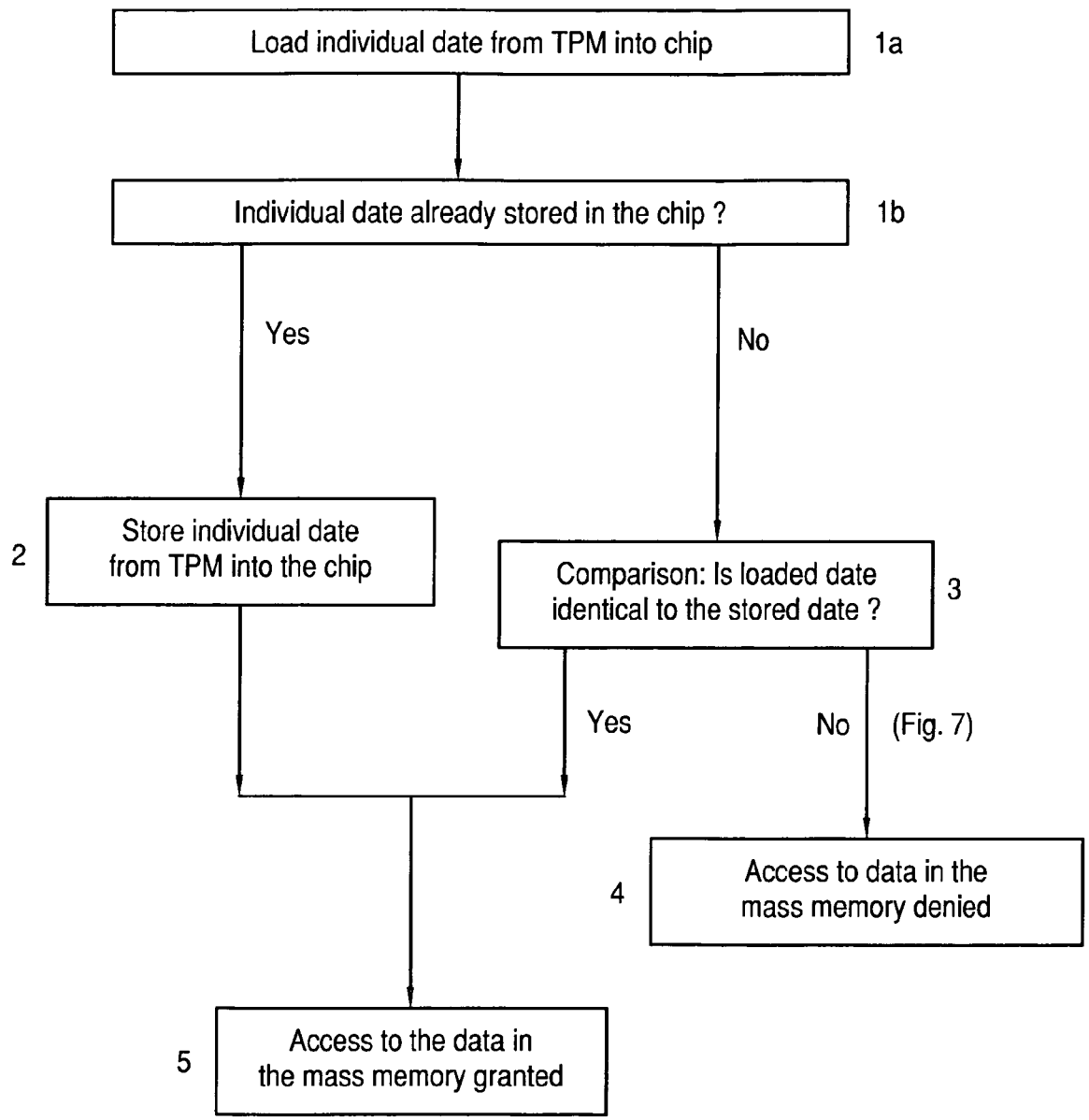
FIG. 6 a flowchart to illustrate a method for accessing the mass memory of a data carrier, in accordance with a further preferred embodiment of the invention.

FIG. 6 shows a flowchart similar to the one shown in FIG. 5. In comparison to the method shown in FIG. 5 in the method according to FIG. 6 firstly in any case in step 1a a predetermined individual date is loaded from the security module (here also designed exemplarily as a trusted platform module TPM) of the use device into the chip. Subsequently it is verified in step 1b whether the chip of the data carrier contains a predetermined individual date. In the case that the chip does not contain the predetermined individual date in step 2 the individual date from the TPM of the use device is stored into the chip, whereby the data carrier is personalized to the use device. Subsequently access to the data in the mass memory is granted. However, in the case that in the chip already a predetermined individual date is stored, in step 3 the now already loaded individual date is compared with the previously stored individual date. The further procedure is identical to that of the method of FIG. 5.

Figure 7:
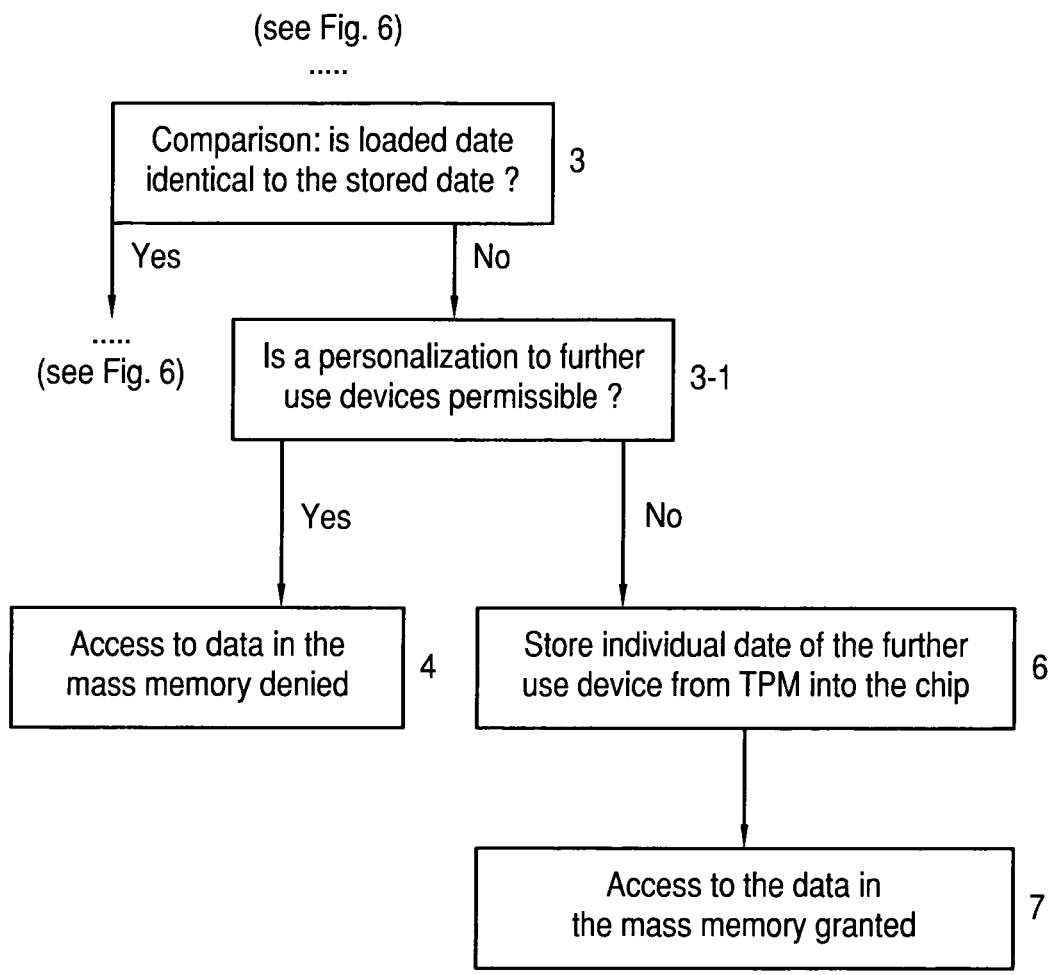
FIG. 7 a flowchart to illustrate a variation of the method of FIG. 6, in which a personalization of the data carrier to several use devices can be possible.

In FIG. 7 a variation of the method of FIG. 6 is shown, in which a data carrier can be personalized to several use devices. In the variation of FIG. 7 subsequent to step 3, if an individual date is already found in the chip, however said date does not correspond to an individual date of the currently accessing use device loaded in step 1a, or does not belong to the accessing use device, it is verified in a step 3-1 whether a personalization of the data carrier to a further use device is permissible. If no, access to data in the mass memory is denied (step 4) in accordance with the procedure shown in FIG. 6. If, however, a personalization of the data carrier to a further use device is permissible ("yes"), the date loaded in step 1a is stored into the chip of the data carrier in a step 6, in order to personalize the data carrier to a further use device. Finally in step 7 access to the data in the mass memory of the data carrier is granted.

In the following methods for accessing an inventive CD with chip according to preferred embodiments of the invention will be explained in detail. The CD has an optical memory with an encrypted section in which data are stored in an encrypted state, and an unencrypted section for booting. The encrypted or unencrypted section can be respectively contiguous or can alternatively have several non-contiguous partial sections. In the chip a key for decrypting the data is stored. The CD is accessed with a CD drive of a computer. The computer contains a security module, here exemplarily designed as a trusted platform module TPM, in which the microprocessor number of the microprocessor of the computer is securely stored. As individual date in the exemplarily described methods the microprocessor number of the computer from the TPM of the computer is used. Alternatively or additionally the serial number of a different computer component (network interface card, mass memory, etc.) can be used or a different individual date than the serial number of the microprocessor or of the computer component.

For different types of data carriers (DVD, SC, CF, MMC), for different types of players for data carriers, in particular for different CD/DVD drives such as e.g. CD/DVD drives in CD/DVD players the method works analogously.

The CD is inserted in the CD drive of the computer (or player etc.). From the unencrypted section of the optical mass memory of the CD an installation program (start- or boot program) is started, by means of which a first communication with the CD is enabled. The installation program detects that a use device is trying via a CD drive to access the CD and demands from the user to carry out the authentication of the accessing use device. For this purpose the chip of the CD has to be accessed.

According to a first alternative the CD drive has a chip reader (more exactly chip reading/writing device). In this case, the chip reader next takes up communication with the chip of the CD.

According to a second alternative the CD drive does not have a chip reader. In this case the user is requested to remove the CD from the CD drive. Subsequently the user contacts the chip with a contact or contactless chip reader. According to a preferred variation a contactless chip reader is used which is integrated in the computer. Further preferably the integrated chip reader is contactable via an NFC interface which takes up communication with the chip "automatically" as soon as the CD has been brought close enough.

The chip reader (internal or external) establishes contact with the TPM of the computer and sends to the TPM a request to send the microprocessor number to the chip, and a transport key with which the TPM is supposed to encrypt the microprocessor number. The transport key preferably is a public key of a PKI pair of keys. The TPM encrypts in the TPM the microprocessor number with the transport key and sends the encrypted microprocessor number to the chip of the CD. The chip receives the encrypted microprocessor number, decrypts it with the secret key to the PKI pair of keys and stores it into the chip.

Next the chip reader verifies whether in the chip a microprocessor number of a computer is stored. Selectively the verification whether in the chip a microprocessor number of a computer is stored is carried out already before requesting the microprocessor number from the TPM.

In the case that no microprocessor number is stored in the chip yet, the loaded microprocessor number is stored into a memory of the chip provided for this purpose (or, if no microprocessor number has yet been loaded, the microprocessor number is requested from the TPM of the computer, as described above, and then stored into the memory). Thereby the CD has been personalized to the computer.

The CD is now ready for decrypting the data in the optical memory. The corresponding method will be described later.

In the case that a microprocessor number is already stored in the chip, the chip compares the microprocessor number delivered by the TPM with the microprocessor number which is already stored in the chip for the personalization of the CD.

In the case that the delivered and the already stored microprocessor numbers do not correspond to each other, access to the data in the optical memory of the CD is denied.

In the case that the delivered and the already stored microprocessor numbers correspond to each other, the CD is ready for decrypting the data in the optical memory.

For decrypting the data in the optical memory of the CD the communication is assigned back to the CD drive. If required, the CD which was removed from the CD drive before, now has to be reinserted in the CD drive. The CD drive reads out the encrypted or partly encrypted data from the optical memory of the CD in a cache which is accessible by the CD drive and the chip reader alike.

Subsequently, the communication is assigned to the chip again, wherein, if required, the CD has to be removed from the CD drive again and coupled with the chip reader. The chip reader transmits the data which were transmitted to the cache before to the chip.

In the chip the data are decrypted. Alternatively the data are decrypted in the cache of the CD drive, for which purpose the decryption key stored in the chip is transmitted to the CD drive, wherein the decryption key preferably never leaves the chip in an unencrypted state, hence is again encrypted itself.

The decrypted data are installed in a memory of the computer provided for this purpose and can subsequently be used as intended.

In the use device the individual date with which the data carrier has been personalized or is intended to be personalized is selectively provided in a security module (e.g. TPM). The security module can for example be provided in a computer, a reading/writing drive of a computer, a player for the data carrier or one of the components of such a player. A—contactless (in particular NFC, alternatively different protocol) or contact—reading device for the chip of the data carrier can also be provided in a computer, a reading/writing drive of a computer, a player for the data carrier or one of the components of such a player. The reading device for the chip of the data carrier and the security module (e.g. TPM) of the use device can selectively be disposed individually or in combination with each other, selectively in the same part of the use device or in different parts of the use device.

The data can for example be program data of a program which can now be installed in the computer.

According to an alternative embodiment of the invention the data carrier is an audio CD with an optical memory, in which audio data are stored which are partly encrypted in such a way that the music which corresponds to the data can be output analogously (acoustically), however only in a bad, noisy sound quality. The data can only be output analogously in an unnoisy state after their decryption.

According to a further alternative embodiment of the invention the data carrier is a video DVD with an optical memory in which video data are stored. In most other respects the DVD corresponds to the audio CD described above. Alternatively an audio/video DVD is provided as data carrier.

According to a further development of the invention which is described in a different patent application filed on the same date, the data carrier additionally has a condition feature by means of which the scope of use of the data carrier is limited, e.g. the number of times of use and/or the term of use. For example as condition feature a flag or counter can be provided which is set or incremented (alternatively decremented) when data from the mass memory are used, e.g. played or installed. Selectively, when the data are deinstalled again, the flag is cleared or the counter is decremented again (alternatively incremented).

The invention claimed is:

1. Method for accessing a mass memory of a data carrier having a mass memory and a chip, wherein for access to the mass memory by means of a use device an authentication of the use device to the chip is mandatory, comprising the steps:
upon access by a use device to the data carrier in order to access the mass memory, the chip is verified by determining upon request by a use device whether a date which is individual for the use device is already stored in the chip, the data carrier being personalized to the use device by means of the individual date of the use device, and access to the mass memory is at the most enabled if in the chip at least one predetermined individual date of the accessing use device is stored and upon a positive comparison of the individual date stored in the chip to the date provided by the accessing use device,
wherein the use device has at least one electronic component and as the individual date, an individual parameter of the electronic component is used.

2. Method according to claim 1, wherein, if according to the verification no individual date is stored in the chip, at least one predetermined individual date of the use device is stored into the chip.

3. Method according to claim 2, wherein, before the predetermined individual date of the use device is stored into the chip, the chip sends an encryption key stored in the chip to the use device, and the use device encrypts the predetermined individual date with the encryption key and sends the encrypted individual date to the chip.

4. Method according to claim 1, wherein data in the mass memory are at least partly stored in an encrypted state, and wherein in the chip furthermore a key for decrypting the encrypted data is stored.

5. Method according to claim 4, wherein the data from the mass memory are decrypted with the key from the chip.

6. Method according to claim 5, wherein the data are decrypted within the chip.

7. Method according to claim 5, wherein the data are decrypted in a security module of the use device.

8. Method according to claim 1, wherein the individual date is kept secret.

9. Method according to claim 1, wherein the individual parameter of the electronic component is a serial number of the component.

10. Method according to claim 9, wherein the electronic component comprises one or more components selected from the group consisting of: a microprocessor, a CPU, a network interface card, a mass memory and a security module.

11. Method according to claim 1, wherein the at least one individual date is stored in the use device in a security module.

12. Method according to claim 1, wherein the use device is a data processing device, with at least one reading unit for the mass memory.

13. Method according to claim 1, wherein the use device is an output device.

14. Method according to claim 1, wherein the mass memory is an optical memory.

15. Method for loading data from a data source into a mass memory of a data carrier having a mass memory and a chip, wherein for the access to the mass memory by means of a use device an authentication of the use device to the chip is mandatory, comprising:
upon an access to the data carrier in order to load data into the mass memory the chip is verified by determining upon request by the use device whether at least one date which is individual for a use device is already stored in the chip, the data carrier being personalized to the at least one predetermined use device by means of the at least one individual date of the at least one predetermined use device, and the loading of data into the mass memory is at the most enabled if in the chip at least one predetermined individual date of a use device is stored and upon a positive comparison of the individual date stored in the chip to the date provided by the accessing use device, wherein subsequently an access to the data in the mass memory is at the most possible with the at least one use device to which the data carrier is personalized, wherein the use device has at least one electronic component and as the individual date, an individual parameter of the electronic component is used.

16. Method according to claim 15, wherein the data are transmitted with an interposed contact computer network from the data source to the data carrier, in order to be loaded into the mass memory of the data carrier.

17. Method according to claim 15, wherein the data are transmitted with an interposed contactless network from the data source to the data carrier, in order to be loaded into the mass memory of the data carrier.

18. Method according to claim 15, wherein for loading the data

- the individual date stored in the chip is transmitted by the chip to the data source,
- in the data source the transmitted individual date is evaluated, and
- the data are transmitted to the data carrier to be loaded into the mass memory.

19. Method according to claim 15, wherein the data are loaded into the mass memory in an encrypted state.

20. Method according to claim 19, wherein the data are encrypted with a key which is generated from the individual date in the chip of the data carrier.

\* \* \* \* \*